US012083954B2

(12) United States Patent
Dekievit et al.

(10) Patent No.: US 12,083,954 B2
(45) Date of Patent: Sep. 10, 2024

(54) LIGHTING UNIT, VEHICLE COMPONENT AND VEHICLE

(71) Applicant: MOTHERSON INNOVATIONS COMPANY LIMITED, London (GB)

(72) Inventors: Gary Dekievit, Lonsdale (AU); Tom Willis, Lonsdale (AU); Matthew Chapman-Winter, Lonsdale (AU); Shane Randell Koehne, Lonsdale (AU); Scott Edwards, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/308,987

(22) Filed: Apr. 28, 2023

(65) Prior Publication Data

US 2023/0347818 A1    Nov. 2, 2023

(30) Foreign Application Priority Data

May 2, 2022    (DE) .................... 10 2022 110 747.7

(51) Int. Cl.
*B60Q 3/66*    (2017.01)
*B60Q 3/16*    (2017.01)
(Continued)

(52) U.S. Cl.
CPC ............ *B60Q 3/66* (2017.02); *B60Q 3/78* (2017.02); *B60Q 3/80* (2017.02); *B60Q 3/16* (2017.02); *B60Q 3/54* (2017.02)

(58) Field of Classification Search
CPC ............. B60Q 3/66; B60Q 6/78; B60Q 3/80; B60Q 3/54; B60Q 3/16
(Continued)

(56) References Cited

U.S. PATENT DOCUMENTS 10,139,068 B2 * 11/2018 Plank .................... F21S 41/143
11,193,641 B2 * 12/2021 Taudt .................... F21S 41/322
(Continued)

FOREIGN PATENT DOCUMENTS

DE    202015009834    7/2020
DE    102021114367    12/2021
(Continued)

OTHER PUBLICATIONS

UK Intellectual Property Office, Appl. GB2306471.0, Combined Search and Examination Report, Oct. 26, 2023.
(Continued)

*Primary Examiner* — Laura K Tso
(74) *Attorney, Agent, or Firm* — Jones Day

(57) ABSTRACT

The present disclosure refers to a lighting unit, in particular in form of a RGB light assembly, comprising one or more lighting segments, wherein each lighting segment comprises several light sources emitting light rays into one or more light guides merging into one light out-coupling surface for guiding the outputted light rays to a lens providing a light output. The light unit may be provided in two alternatives either the light sources directly face the lens such that light rays are guided through the light guide to pass the lens to light up a surface, or the light sources emit light rays to enter the light guide to be guided to a reflector which focuses the light rays into a light window of a mask to light up the lens in the region of the light window.

38 Claims, 7 Drawing Sheets

(51) Int. Cl.
　　　*B60Q 3/54*　　　(2017.01)
　　　*B60Q 3/78*　　　(2017.01)
　　　*B60Q 3/80*　　　(2017.01)

(58) Field of Classification Search
　　　USPC .................................................. 362/488, 511
　　　See application file for complete search history.

(56) References Cited

U.S. PATENT DOCUMENTS

| | | |
|---|---|---|
| 2006/0239006 A1 | 10/2006 | Chaves et al. |
| 2012/0275173 A1* | 11/2012 | Hamm ................... F21S 41/24 |
| | | 362/487 |
| 2020/0244044 A1 | 7/2020 | Ramer et al. |
| 2023/0098251 A1* | 3/2023 | Brohm ................. G02B 6/0088 |

FOREIGN PATENT DOCUMENTS

| | | |
|---|---|---|
| DE | 202022103655 | 7/2022 |
| JP | 2015501513 | 1/2015 |
| WO | WO 2015/018852 | 2/2015 |
| WO | WO 2017/045938 | 3/2017 |

OTHER PUBLICATIONS

German Patent Office, Appl. 10 2022 110 747.7, Office Action, Jan. 20, 2023.

* cited by examiner

LIGHTING UNIT, VEHICLE COMPONENT AND VEHICLE

CROSS-REFERENCE TO RELATED APPLICATION

This application claims the benefit of priority to German Patent Application No. DE 10 2022 110 747.7, filed on May 2, 2022, which is hereby incorporated by reference in its entirety for all purposes.

FIELD

The present disclosure relates to lighting unit for a vehicle, in particular in form of a RGB light assembly, a vehicle component with such a lighting unit and a vehicle with such a vehicle component.

RELATED ART

U.S. Pat. No. 9,726,809 B2 describes a vehicle lighting unit which can include a first LED and a second LED each having a different color; a first light guiding lens and a second light guiding lens disposed in front of the first and second LEDs, respectively, configured to guide light rays from the first and second LED, respectively, to cause the light rays to exit there through forward; and a diffusion lens disposed in front of the first and second light guiding lenses, configured to diffuse the light rays from the first and second light guiding lenses. The light exiting faces of the first and second light guiding lenses can be configured to be long and adjacent to each other in the vertical direction with the lengthwise directions coincide with each other. The diffusion lens can have a long shape so as to cover the entire front light exiting faces of the first and second light guiding lenses.

WO 2015/131223 A1 relates to decorative coatings for plastic substrates, the decorative coatings ideally being stable and durable coatings that are spectrally tuneable to permit the selection of a variety of appearances, and ideally providing a decorative metal finish. More particularly a plastic substrate having a decorative coating including a spectrally controlling system and a stress controlling system is described. The spectrally controlling system includes alternating absorbing layers and transparent layers, and the stress controlling system controls the overall residual stress of the decorative coating to within a desired range.

A chromium-based reflective coating for a polymeric substrate is known from WO 2013/110112 A1, wherein the coating has a thickness of 200 nm or less and is an alloy of chromium and a dopant material, the dopant material being selected from the hexagonally close-packed transition metals, the alloy having a crystal structure of a primary body-centered cubic phase in coexistence with a secondary omega hexagonally close-packed phase.

Lighting illumination and/or color mixing for lighting solutions, especially with reduced and small packaging spaces, goes together with several problems. Hot spots, visibility of LED's and poor visual appearance for final products are mayor challenges. Further, luminance variations for individual chips, poor visual perceptions and cut-off issues with individual segments make it difficult to create an even illumination or a distinct segment style without blurred edges. Still further, increased current draw for luminance required for multi LED solutions is unattractive. In addition, AST (advanced surface technology) coatings typically absorb between 90-94% light transmissions, and, thus, require light high efficiency.

SUMMARY

It is an object of the present disclosure to provide a lighting unit for a vehicle which overcomes the drawback of the prior art. Thus, it is in particular the object to provide an efficient illumination.

This object may be achieved according to the present disclosure by a lighting unit, in particular in form of a RGB light assembly, comprising one or more lighting segments, wherein each lighting segment comprises several light sources emitting light rays into one or more light guides merging into one light out-coupling surface for guiding the outputted light rays to a lens providing a light output, wherein either the light sources directly face the lens such that light rays are guided through the light guide to pass the lens to light up a surface, or the light sources emit light rays to enter the light guide to be guided to a reflector which focuses the light rays into a light window of a mask to light up the lens in the region of the light window.

In embodiments according to the present disclosure the one or more light guides are non-diffuse or low diffuse light guides being bend along the light travel direction from the light sources to the lens and/or arranged with the light out-coupling surface adjacent to a reflector and/or partly screened from the lens by a masking providing a light window defining the light output.

The lighting unit of embodiments may be characterized in that the light sources are provided by LEDs supported on a single printed circuit board and/or the light sources or groups of light sources are individually controllable.

It is also proposed that the one or more light guides is/are provided with a light in-coupling surface and/or entry optics for each light source or each group of light sources, and/or the one or more light guides are coupled with side wall optics, coatings and/or films, and/or between two neighboring light guides a masking, coating and/or film is arranged, and/or the light out-coupling surface of the one or more light guides is at least partly provided with a masking, an in-mold decoration (IMD), a coating and/or separate film.

Further, it is proposed that a single lens is arranged with each or all lighting segments, and/or the lens is at least partly provided with a masking, an in-mold decoration (IMD), a coating and/or separate film.

Still further, it is proposed that the film is a clear film, with screen printed or digital printed mask and/or with a diffuse backing, and/or the coating is an AST coating, preferably comprising a metal and/or metal alloy.

According to aspects of the present disclosure the one or more lighting segments, preferably a plurality of lighting segments, is arranged at least partly between a housing and a cover, and/or one or more printed circuit board, preferably a single printed circuit board, for the light sources is supporting the one or more light guides at least partly, and/or a support supports the one or more printed circuit boards and/or the one or more light guides and/or the reflector at least partly.

According to further aspects of the present disclosure at least two lighting segments are coupled together and/or stacked, with side faces close together or touching and/or having side faces with reflective or absorbing surface or an absorb shim placed in-between the lighting segments, and/or the light output is controllable via the light sources.

It is also proposed that the several light sources comprise light sources emitting light of different colors, and/or the reflector is in form of a Lambertian or diffuse reflector.

According to one aspect of the present disclosure, in case the light rays are focused by the reflector, the mask is on the side of the lens facing the light guide, and/or the mask is arranged between the lens and the one or more lighting segments, and/or the mask is molded together with the lens, preferably as a 2K molding part.

This embodiment may be further characterized in that the lens has a substantially V-shaped cross-section to house at least the light guide and the reflector, and/or the lens is provided with a plurality of capacitive touch areas, and/or the light output is strip like.

With embodiments of the present disclosure it is further proposed that the support is formed with an extension, with preferably the extension having a substantially S shaped cross-section adapted to the bend form of the light guide and suited to carry the reflector at the light out-coupling surface of the light guide(s).

In addition, according to aspects of the present disclosure the cover is at partly covered by the lens, and/or the cover fixes the position of the reflector, and/or the cover extends at least along the light guide(s) and/or the one or more lighting segments from the light in-coupling surface(s) to the light out-coupling surface.

The lighting unit may be adapted to be used with a door trim, an operator panel, a dashboard or a rear view device of a vehicle, and/or the lens may be provided with a plurality of capacitive touch areas.

The lighting unit of the present disclosure may further comprise a control unit for controlling the light emitted by the light sources, in particular by turning the lighting segments individually on and off.

Embodiments of the present disclosure may also provide a vehicle component, in particular in form of a door trim, an operator panel, a dashboard or a rear view device, comprising at least one lighting unit of the present disclosure.

The control unit may be provided by the central control unit of the vehicle and/or a mobile device.

Still further, the present disclosure provides a vehicle with at least one vehicle component according to the present disclosure.

Non-diffuse or low diffuse light guides, e.g. PMMA Acrylite LD12, for avoiding light intensity losses may be used in lighting units of the present disclosure. Entry optics may be used with the light guides for removing point source characteristics. Further, the light guides may be coupled with specifically shaped side wall optics to spread the incoming light rays across the light out-coupling surface and/or to spread the output at each side wall shaped optics. This creates an even to the eye illumination at the output face of a lens, due to efficiently transporting LED light rays. Still further, color mixing and diffusion may be implemented for even distribution across the intended viewing direction.

It is one perception of this disclosure that an even illumination in particular in strip form can be obtained by making usage of a light guide and (Lambertian) reflector combination. The reflector is positioned as close as possible to the desired light output visible surface and is shaped to create a diffusion, color mixing and light directing. Thus, the reflector may ensure full visibility to the eye at large range of positions.

In order to reduce the needed space, distances within the lighting unit may be reduced. Non-diffusive light guides allow to shape the light output colors. Using short and non-diffuse light guides requires to uniformly mix the light colours of RGB type LEDs. This is achieved by
multiple LEDs with appropriate spacing,
bend light guide(s) and
(Lambertian) reflector.

The lighting units of the present disclosure are not limited to RGB assemblies. Rather, they may also be used with single color or white or black LEDs.

By utilizing lighting segments both light cut off effects and strip lighting with reduced visible boundaries may be created.

By coupling lighting segments, which may be stacked in a housing, with side faces all close or touching, having side faces with reflective or absorbing surface, individual segments with sharp cut-offs may be created. Absorb shim(s) may be place in-between lighting segments, if required.

As lighting segments may be coupled together to create a.o. the effect of a long light guide, tooling costs are kept down to the ones of small segment.

Masking by for example in-mold decoration (IMD) or a separate film may be used to shape the light output. A clear film, with screen printed or digital printed mask, with a diffuse backing helps to remove visible gaps between light rays emitted from individual LEDs and/or the visibility of the optical system. Masking may be placed between an optical system and the lens.

High luminance for AST style coatings requires high efficiency of optical systems to prevent high power requirements. To reduce the amount of required LEDs and the size of the printed circuit boards carrying the same, optically clear materials for the light guides is used according to the present disclosure. To mix different color light rays emitted by different color LEDs, a Lambertian reflector may be used, which can increase the mixing effect approx. 5-10 times. Diffusion is done as close as possible to the light output(s) and not by using diffusion light guides.

In addition to lit up zones, which may be created with IMD or internal masking, capacitive touch zones may be created, using a IMD molding film or a mask.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 1b is a perspective view of the assembled lighting unit of FIG. 1a.

FIG. 2b is a perspective view of the assembled lighting unit of FIG. 2a.

FIG. 4b is a perspective view of the assembled lighting unit of FIG. 4a.

DETAILED DESCRIPTION

Figure 1A:
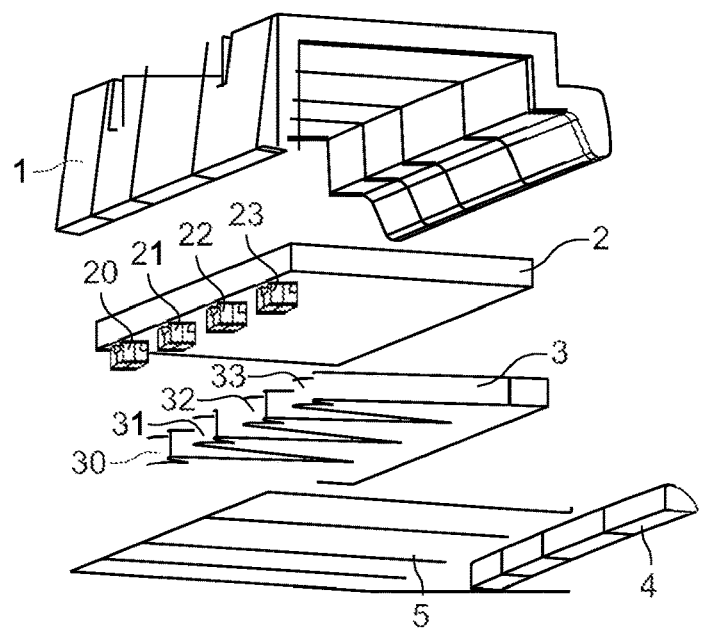
FIG. 1a is an exploded view of a lighting unit with direct facing LEDs.

Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1B:
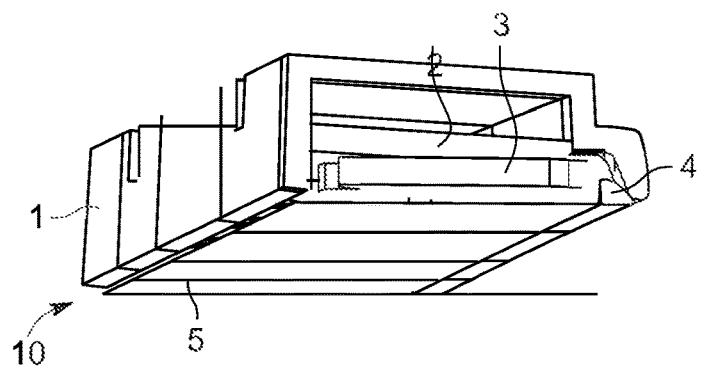
Figure 1C:
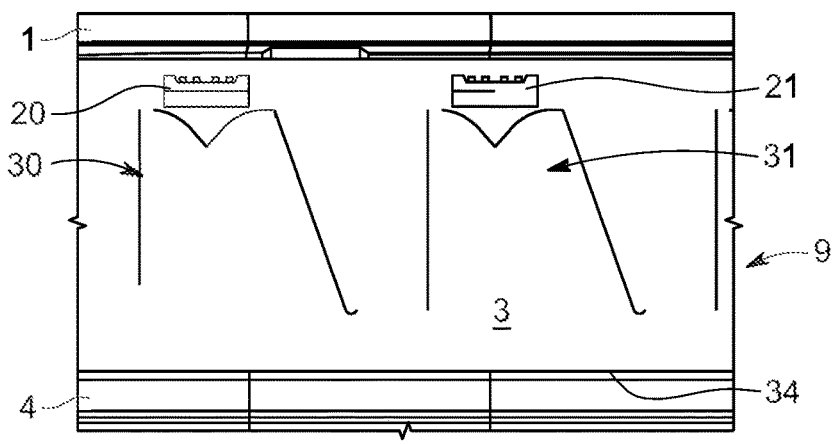
FIG. 1c is a cross-sectional view of the lighting unit of FIG. 1b.

FIGS. 1a to 1c depict a lighting unit in form of a RGB light assembly 10 comprising a housing 1, a printed circuit board 2, a light guide 3, a lens 4, and a cover 5. The printed circuit board 2, together with LEDs 20, 21, 22, 23, and the light guide 3 provide a lighting segment 9 arranged between the housing 1 and the cover 5 and behind the lens 4.

The printed circuit board 2 carries four LEDs 20, 21, 22, 23 emitting light of different colors into four respective light in-coupling surfaces 30, 31, 32, 33 of the light guide 3 being formed to provide light in-coupling optics and merging together along the light propagation direction to provide one common light out-coupling surface 34, as best seen in FIG. 1c.

The LEDs 20, 21, 22, 23 directly face the lens 4, such that the RGB light assembly 10 of FIGS. 1a to 1c provide a so called direct facing solution, which allows light rays to be guided through the light guide 3 to the lens 4 and exit the lens 4 to lighten up a surface, e.g. on the internal side of a door of vehicle (not shown). The light output of the RGB light assembly 10 is very efficient, and removes so called "hot spots".

Figure 2A:
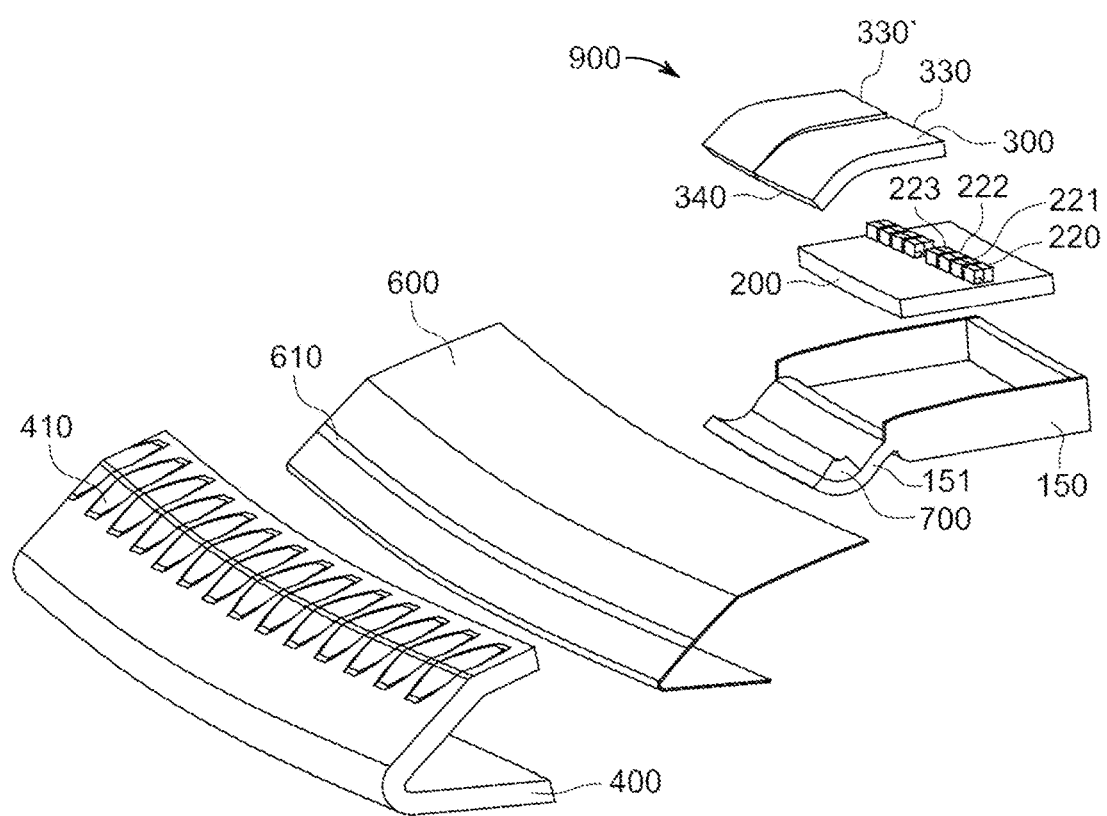
FIG. 2a is an exploded view of a lighting unit with non-direct facing LEDs.
Figure 2B:
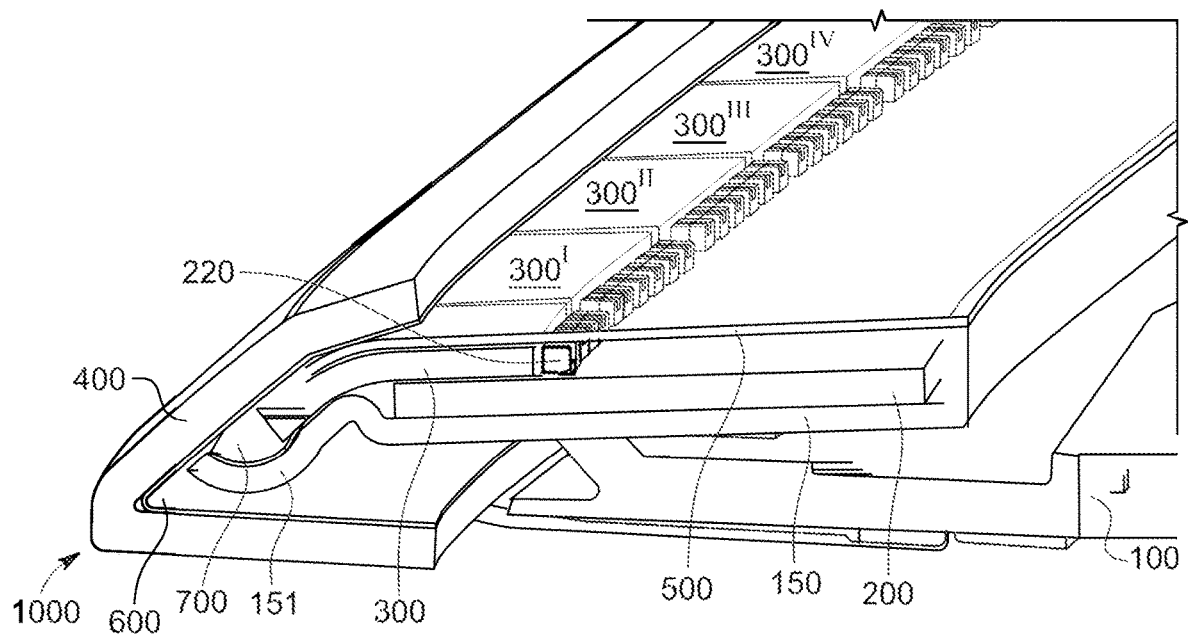
Figure 2C:
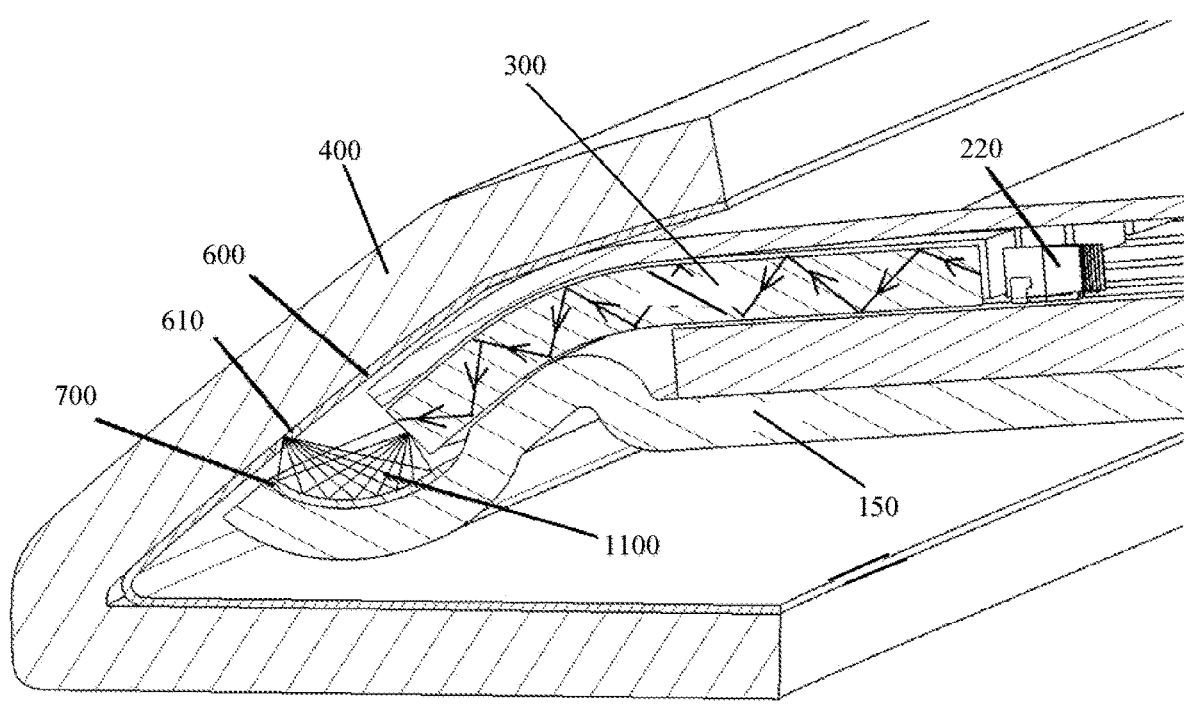
FIG. 2c is a cross sectional view through the assembled lighting unit of FIG. 2b.

FIGS. 2a to 2c show a RGB light assembly 100 implementing a non-direct LED solution and being suited for efficiently providing light signals without blurred edges. Pointing LEDs away from the intended viewing direction removes the point source characteristics of the LEDs. Coupling a lighting segment with a Lambertian or Gaussian reflector or diffuse reflector to focus, concentrate or shape the light output to be directed to the viewing direction will be described in the following.

FIGS. 2a to 2c depict a lighting segment 900 of the RGB light assembly 1000. The lighting segment 900 comprises in line with FIG. 2a a printed circuit board 200 carrying two times 4 LEDs 220, 221, 222, 223 arranged to emit light into two light in-coupling surface 330, 330' of a light guide 300 with one light out-coupling surface 340 guiding the light to a reflector 700 reflecting light to a mask 600, which is providing one strip like light window 610 such that the light can pass through the light window 610 and through a lens 400.

As best shown in FIG. 2b, the printed circuit board 200 is arranged on a support 150. The support 150 is formed with an extension 151, which has a substantially S shaped cross-section adapted to the bend form of the light guide 300 and suited to also carry the reflector 700 at the light out-coupling surface 340 of the light guide 300. The reflector 700 is fixed in position via a cover 500 partly covered by the lens 400 having a substantially V shaped cross-section. Between the lens 400 and the lighting segment 900 on the support 150, the mask 600 is arranged. Further a housing 100 is arranged opposite the cover 500.

FIG. 2c provides further details on the light rays 1100, which are emitted by the LED 220, enter the light guide 300 to be led to the reflector 700, which focuses the light rays 1100 into the light window 610 to efficiently light up the lens 400 in the region of the light window 610.

FIG. 2a also shows that the lens 400 is provided with a plurality of capacitive touch areas 410, and FIG. 2b shows that the lens 400 cooperates with a plurality of light guides 300-300'⁰, each one being formed and function as explained with respect to the light guide 300.

Figure 3:
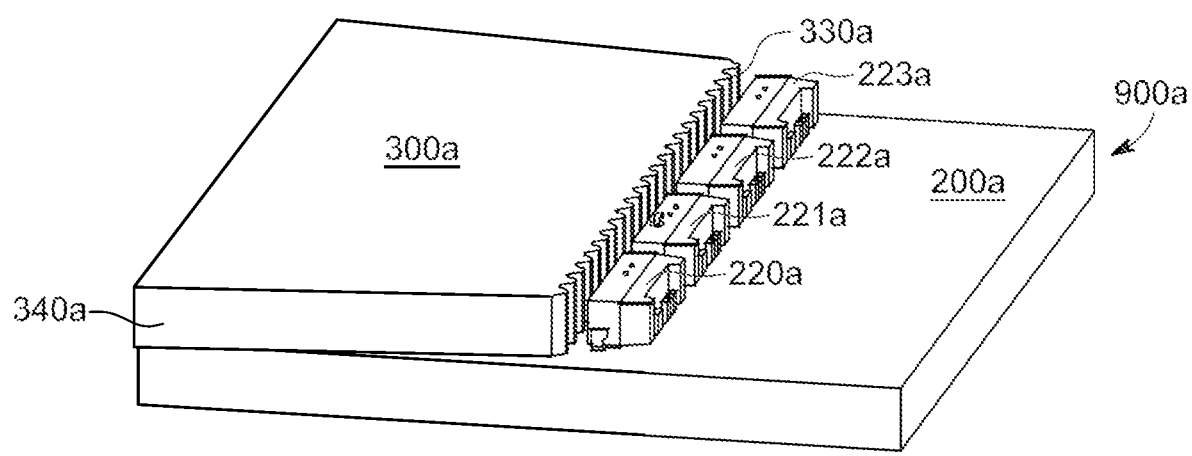
FIG. 3 is a perspective view of a part of an alternative lighting unit.

An alternative lighting segment 900a is shown in FIG. 3, with a light guide 300a having a single light in-coupling surface 330a facing four LEDs 220a, 221a, 222a, 223a carried by a printed circuit board 200a. The light in-coupling surface 330a is provided with optics, and opposite the light in-coupling surface 330a a light out-coupling surface 340a is provided by the the light guide 300a.

Figure 4A:
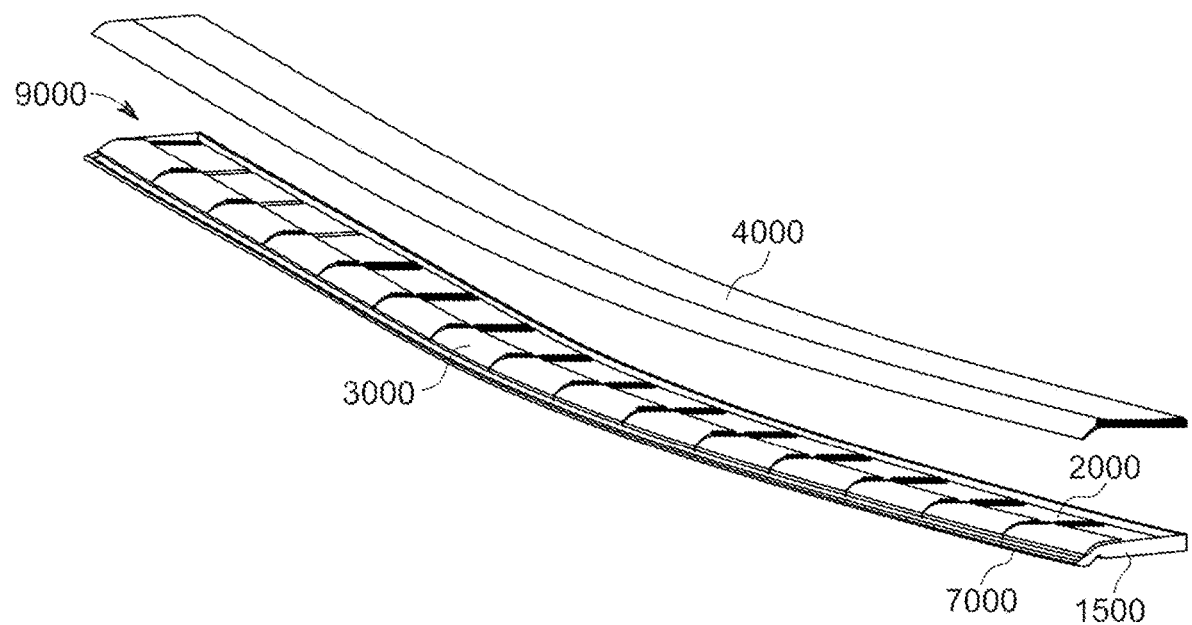
FIG. 4a is an exploded view of a further alternative lighting unit with non-direct facing LEDs.
Figure 4B:
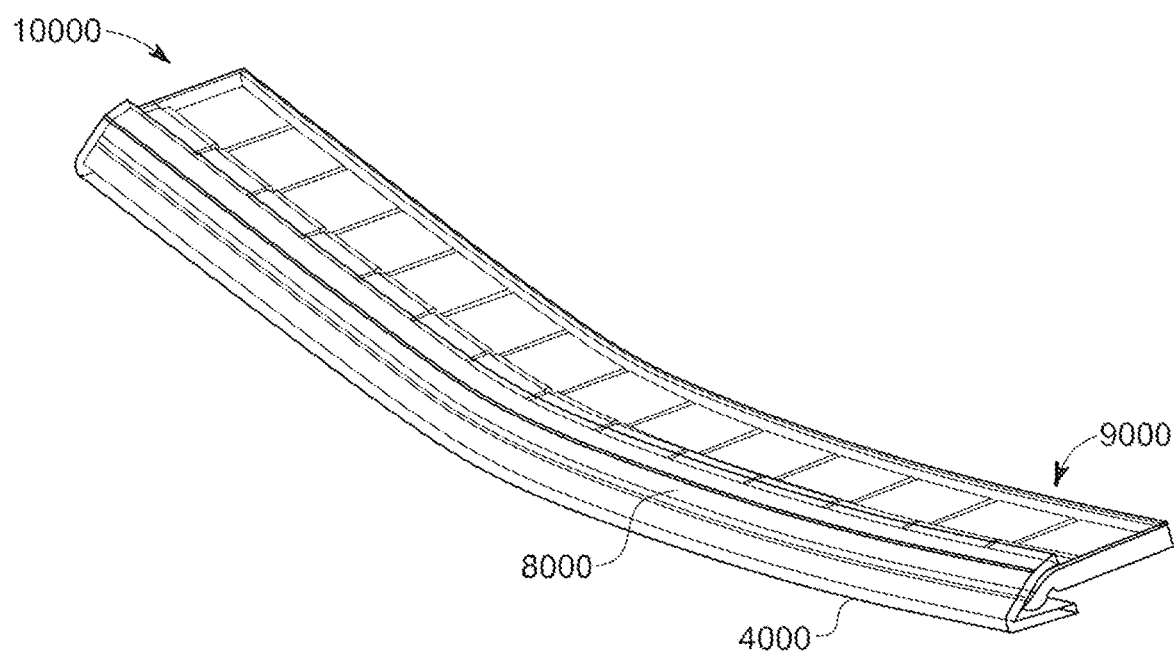

FIGS. 4a and 4b show a further alternative lighting segment 9000 for a RGB light assembly 1000, with a support 1500 for a printed circuit board 2000 together with LEDs (not shown), a light guide 3000 and a reflector 7000 partly covered by a lens 4000. In fact, a plurality of such lighting segments 9000 is shown, with the lighting segments 9000 being joined together to create a long light output.

Figure 5:
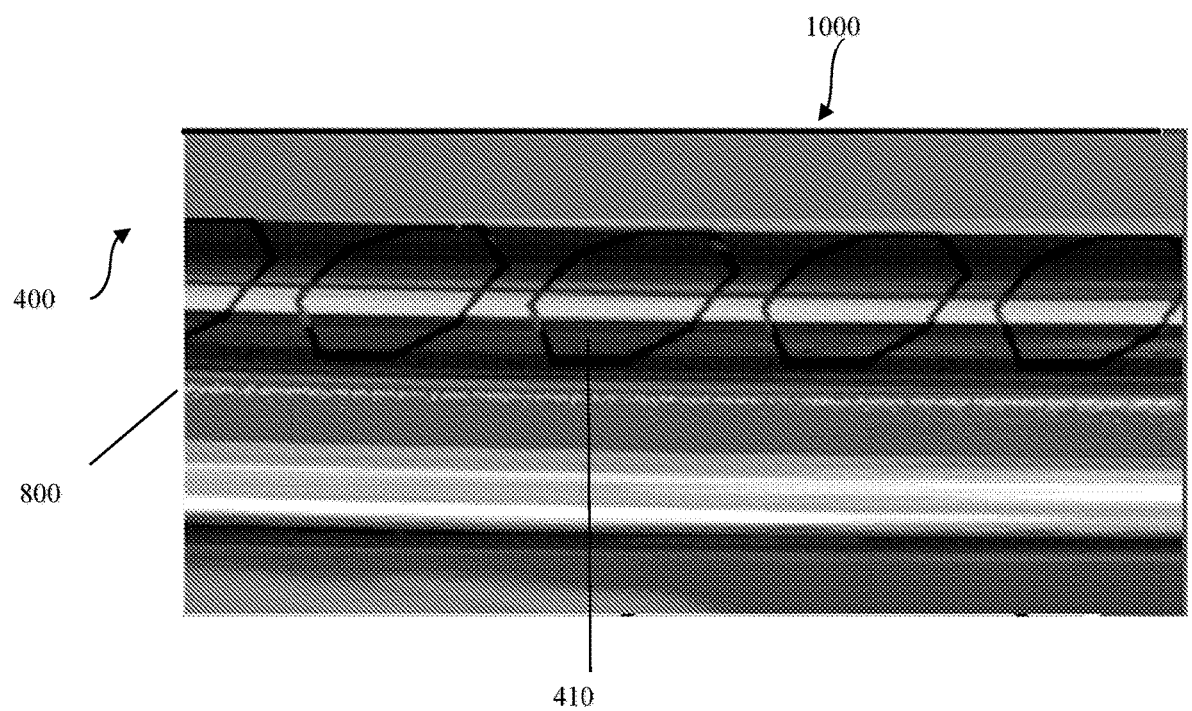
FIG. 5 is a front view of a lighting unit of FIG. 2b.

FIG. 5 shows the light output of the assembled lighting unit 1000 of FIGS. 2b and 2c in form of a light stripe 800 on the lens 400, and FIGS. 6a to 6d show different lighting effects provided by a light stripe 800a to 800d which can be obtain for example with the lighting segments 9000 of FIG. 4b. The light stripes 800 and 800a to 800d are efficiently lit up due to the focusing of the light rays 1100 into the mask window 610.

Figure 6A:
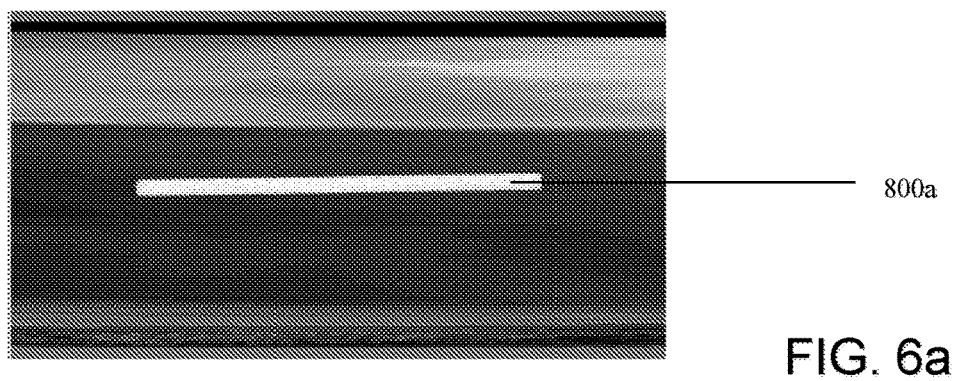
FIGS. 6a-6d are front views of a lighting unit of the present disclosure demonstrating different lighting effects.

The light strips depend on a coating of the lens, which can be an AST coating, in particular as described in WO 2015/131223 A1, WO 2013/110112 A1 or AU 2021 900 071 (not pre-published). FIG. 6a is a simulation of a panel with a 7% transmission coating leading to the light stripe 800a.

Figure 6B:
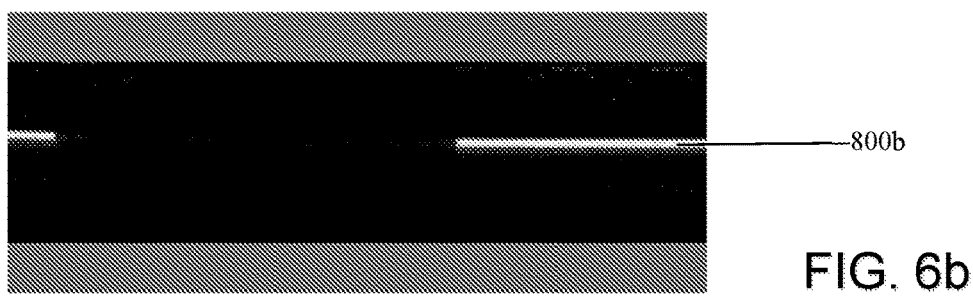
Figure 6C:

Further, the light strips depend on which of the lighting segments and/or LEDs are turned on. FIGS. 6b and 6c differ from each other by turning individual lighting segments off in FIG. 6b such that the light stripe 800b has a gap, while the light stripe 800c is continuous.

Figure 6D:
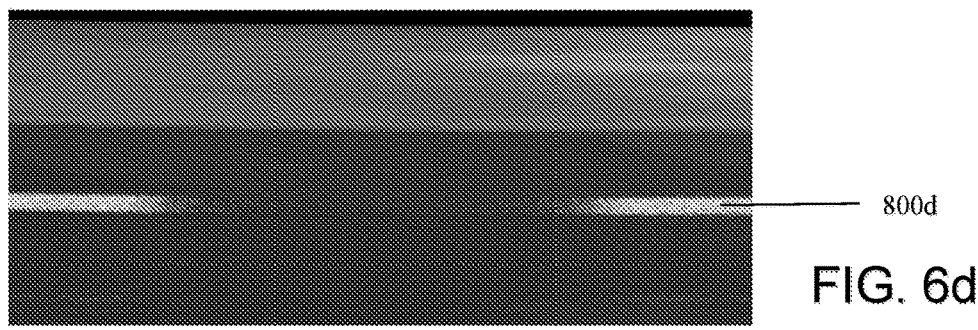

Still further, the light strips depend on the shape of the lighting segments and the optics at the light in-coupling surface as well as the light out-coupling surface. FIG. 6d shows an example light strip 800d with a fade out effect.

For all discussed lighting units, very small and/or highly constrained packaging spaces can utilized to create color mixing and even distribution. This is even possible with total light guide lengths as small as 7 mm or so. Due to the improved total packaging space, low current draw requirements per luminance output (NIT) is given.

By utilizing lighting segments both light cut off effects and strip lighting with reduced visible boundaries can be created.

In addition to lit up zones, which can be created with IMD or internal masking, capacitive touch zones may be created, using capacitive touch panels provided in a IMD molding film or in a mask. Thus, the lighting units of the present disclosure can be used in operator panels, for example provided in a dashboard or a rear view device of a vehicle.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

REFERENCE SIGNS 1 housing
2 printed circuit board
3 light guide
4 lens
5 cover
9 lighting segment
10 RGB light assembly
20-23 LED
30-33 light in-coupling surface
34 light out-coupling surface
100 housing
150 support
151 extension
200 printed circuit board
220-223, 220a-223a LED
300-300 iv, 300a light guide
330, 330', 330a light in-coupling surface
340, 340a light out-coupling surface
400 lens
410 capacitive touch area
500 cover
600 mask
610 window
700 reflector
800-800d light strip
900, 900a lighting segment
1000 RGB light assembly
1100 light rays
1500 support
2000 printed circuit board
3000 light guide
4000 lens
7000 reflector
8000 light strip
9000 lighting segments
10000 RGB light assembly

The invention claimed is:

1. A lighting unit, comprising:
a lens; and
one or more lighting segments, each lighting segment comprising,
a plurality of light sources,
one or more light guides, and
a light out-coupling surface,
wherein the plurality of light sources emit light rays into the one or more light guides, and the one or more light guides merge into the light out-coupling surface for guiding outputted light rays to the lens to provide a light output, and
wherein the plurality of light sources emit light rays which enter the one or more light guides to be guided to a reflector which focuses the light rays into a light window of a mask to light up the lens in a region of a light window.

2. The lighting unit of claim 1, wherein the plurality of light sources directly face the lens such that light rays are guided through the one or more light guides to pass the lens to light up a surface.

3. The lighting unit of claim 1, wherein the lighting unit is a RGB light assembly.

4. The lighting unit of claim 1, wherein the one or more light guides are non-diffuse or low diffuse light guides.

5. The lighting unit of claim 4, wherein the one or more light guides are bent along a light travel direction from the plurality of light sources to the lens.

6. The lighting unit of claim 4, wherein the one or more light guides are arranged with the light out-coupling surface adjacent to a reflector.

7. The lighting unit of claim 4, wherein the one or more light guides are partly screened from the lens by a masking providing a light window defining the light output.

8. The lighting unit of claim 1, wherein the plurality of light sources are provided by LEDs supported on a single printed circuit board.

9. The lighting unit of claim 1, wherein the plurality of light sources or groups of the plurality of light sources are individually controllable.

10. The lighting unit of claim 1, wherein the one or more light guides are provided with a light in-coupling surface or entry optics for each of the plurality of light sources or each group of the plurality of light sources.

11. The lighting unit of claim 1, wherein the one or more light guides are coupled with side wall optics, coatings or films.

12. The lighting unit of claim 1, wherein the light out-coupling surface of the one or more light guides is at least partly provided with a masking, an in-mold decoration (IMD), a coating or separate film.

13. The lighting unit of claim 1, wherein a single lens is arranged with each of the plurality of lighting segments.

14. The lighting unit of claim 1, wherein the lens is at least partly provided with a masking, an in-mold decoration (IMD), a coating or separate film.

15. The lighting unit of claim 12, wherein the light out-coupling surface of the one or more light guides is at least partly provided with a separate film and the separate film is a clear film with screen printed or digital printed mask or with a diffuse backing, and the coating is an AST coating comprising a metal or metal alloy.

16. The lighting unit of claim 14, wherein the lens is at least partly provided with a separate film and the separate film is a clear film with screen printed or digital printed mask or with a diffuse backing, and the coating is an AST coating comprising a metal or metal alloy.

17. The lighting unit of claim 1, wherein the one or more lighting segments are arranged at least partly between a housing and a cover.

18. The lighting unit of claim 1, wherein one or more printed circuit board for the plurality of light sources at least partly supports the one or more light guides.

19. The lighting unit of claim 18, wherein the one or more printed circuit board or the one or more light guides or a reflector is supported by a support.

20. The lighting unit of claim 1, wherein at least two lighting segments are coupled together or stacked, with side faces close together or touching and having side faces with a reflective or absorbing surface or an absorb shim placed in-between the at least two lighting segments.

21. The lighting unit of claim 1, wherein the light output is controllable via the plurality of light sources.

22. The lighting unit of claim 1, wherein the plurality of light sources comprise light sources emitting light of different colors.

23. The lighting unit of claim 1, wherein the reflector is a Lambertian or diffuse reflector.

24. The lighting unit of claim 1, wherein the mask is on a side of the lens facing the light guide.

25. The lighting unit of claim 1, the mask is disposed between the lens and the one or more lighting segments.

26. The lighting unit of claim 1, wherein the mask is molded together with the lens as a 2K molding part.

27. The lighting unit of claim 1, wherein the lens has a substantially V-shaped cross-section to house at least the one or more light guides and the reflector.

28. The lighting unit of claim 1, wherein the lens is provided with a plurality of capacitive touch areas.

29. The lighting unit of claim 1, wherein the light output is strip like.

30. The lighting unit of claim 19, wherein the support is formed with an extension.

31. The lighting unit of claim 30, wherein the extension has a substantially S shaped cross-section adapted to a bent form of the one or more light guides and configured to carry the reflector at the light out-coupling surface of the one or more light guides.

32. The lighting unit of claim 17, wherein the cover is at partly covered by the lens.

33. The lighting unit of claim 17, wherein the cover fixes a position of a reflector.

34. The lighting unit of claim 17, wherein the cover extends at least along the plurality of light guides or the one or more lighting segments from one or more light in-coupling surfaces to the light out-coupling surface.

35. The lighting unit of claim 1, further comprising:
a control unit for controlling the light emitted by the plurality of light sources by turning the one or more lighting segments individually on and off.

36. A vehicle component in form of a door trim, an operator panel, a dashboard, or a rear view device, comprising at least one lighting unit of claim 1.

37. The vehicle component of claim 35, wherein the control unit is provided by a central control unit of a vehicle or a mobile device.

38. A vehicle with at least one vehicle component according to claim 36.

* * * * *